(12) United States Patent  
Inada et al.

(10) Patent No.: US 8,975,766 B2  
(45) Date of Patent: Mar. 10, 2015

(54) POWER GENERATION INPUT DEVICE AND ELECTRONIC-APPARATUS USING THE POWER GENERATION INPUT DEVICE

(75) Inventors: Yuji Inada, Miyagi-ken (JP); Katsutoshi Suzuki, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 366 days.

(21) Appl. No.: 13/543,562

(22) Filed: Jul. 6, 2012

(65) Prior Publication Data

US 2013/0010510 A1  Jan. 10, 2013

(30) Foreign Application Priority Data

Jul. 7, 2011  (JP) ................................ 2011-150605

(51) Int. Cl.
    *F02B 63/04*  (2006.01)
(52) U.S. Cl.
    USPC ........................................... 290/1 R; 290/1 E
(58) Field of Classification Search
    CPC ................................ H02M 7/068; H02M 7/06
    USPC ............. 290/7, 8, 1 R; 322/49, 52; 310/75 A, 310/75 B, 83, 81
    See application file for complete search history.

(56) References Cited

U.S. PATENT DOCUMENTS

| | | | | |
|---|---|---|---|---|
| 237,167 | A * | 2/1881 | Butler | 310/75 B |
| 263,134 | A * | 8/1882 | Edison | 322/27 |
| 2,567,290 | A * | 9/1951 | Livingston | 310/36 |
| 3,675,059 | A * | 7/1972 | Thees | 310/156.08 |
| 4,761,527 | A * | 8/1988 | Mohr | 219/645 |
| 4,798,926 | A * | 1/1989 | Sakai | 219/634 |
| 6,657,351 | B2 * | 12/2003 | Chen et al. | 310/171 |
| 7,759,809 | B2 * | 7/2010 | Draper | 290/1 R |
| 2002/0070613 | A1 * | 6/2002 | Cordiale | 310/14 |
| 2010/0253091 | A1 * | 10/2010 | Tseng et al. | 290/1 R |

* cited by examiner

*Primary Examiner* — Julio Gonzalez  
(74) *Attorney, Agent, or Firm* — Brinks Gilson & Lione (57) ABSTRACT

First and second opposing ends are formed in a magnetic path forming member on which a power generation coil is wound. A rotating body has a permanent magnet, a first magnetization member and a second magnetization member. When an operating force does not act on an operating member, an end surface of the first magnetization member is opposed to the first opposing end via a gap and an end surface of the second magnetization member is opposed to the second opposing end via a gap. When the operating member is pressed, the rotating body rotates and when the force to the operating member is released, the operating member and the rotating body return. Since the rotating body and the magnetic path forming member do not come into contact with each other, the force required to operate the operating member is relatively weak and large electromotive force can be obtained.

8 Claims, 7 Drawing Sheets

POWER GENERATION INPUT DEVICE AND ELECTRONIC-APPARATUS USING THE POWER GENERATION INPUT DEVICE

CLAIM OF PRIORITY

This application claims benefit of Japanese Patent Application No. 2011-150605 filed on Jul. 7, 2011, which is hereby incorporated by reference in its entirety.

BACKGROUND

1. Field of the Disclosure

The present disclosure relates to a power generation input device which can generate power according to an operating force from the outside, and to an electronic apparatus where a transmitting operation or the like is performed according to the electromotive force of the power generation input device when it is operated.

2. Description of the Related Art

In FIG. 7 of Japanese Unexamined Patent Application Publication No. 2009-199961, a basic structure of a self-power generating type key input device is disclosed.

The key input device includes a core forming a magnetic path and a coil portion wound on the core. Both ends of the core are opposed to each other via a space and a rod-shaped magnet can be interposed in the space. The electromotive force is generated in the coil from the change of magnetic flux in the core when the magnet is interposed in the space and change of the magnetic flux in the core when the magnet is withdrawn from the space.

The key input device disclosed in Japanese Unexamined Patent Application Publication No. 2009-199961 is moved in or out of the space without changing the orientation of the magnetic poles of the magnet. Thus, the orientation of the magnetic flux in the core is not reversed, an amount of change of the magnetic flux in the core is small and the power generation efficiency is poor.

In the structure, when the magnet is inserted in the space, the magnet is attracted to an end of the core and moves at a relatively fast speed; however, when the magnet is withdrawn from the space, since a force acts in an orientation where the magnet is prevented from withdrawing from the magnet, there is a limit to the speed up the withdrawal. Since the electromotive force is proportional to the change per unit time of the magnetic flux in the core, the electromotive force that is induced when the magnet is withdrawn from the space decreases greatly compared to the electromotive force that is induced when the magnet is moved into the space. In order to increase the electromotive force, a return spring is required to exert a strong force to withdraw the magnet from the space; however, the force of the return spring acts as a resistance against the operating force and the device is hard to operate.

The transducer disclosed in FIGS. 3 and 4 of U.S. Patent Application Publication No. 2006/0091984 A1, is provided with stop points opposed to each other at both ends of the soft-magnetic member on which the coil is wound. A permanent magnet is supported so as to rotate freely around its axis between the soft-magnetic members, and a first magnet layer and a second magnet layer are stacked on both surfaces of the permanent magnet. Both ends of the first magnet layer and both ends of the second magnet layer are opposed to each other in parallel, and the stop points of the soft magnetic element are inserted therebetween.

When the permanent magnet rotates in the clockwise direction, one end of the first magnet layer and one end of the second magnet layer are magnetically attracted and fixed to the stop points of the soft magnetic member, and when the permanent magnet rotates counterclockwise, the other end of the first magnet layer and the other end of the second magnet layer are magnetically attracted and fixed to the stop points of the soft magnetic member. The transducer also generates the electromotive force to the coil with the change of the magnetic flux in the soft magnetic member when the permanent magnet rotates in the clockwise direction and with the change of the magnetic flux in the soft magnetic member when the permanent magnet rotates in the counterclockwise direction.

Since the first magnet layer and the second magnet layer are attracted and fixed to the soft magnetic member in both directions when the permanent magnet rotates in the clockwise direction and in the counterclockwise direction, the transducer disclosed in U.S. Unexamined Patent Application Publication No. 2006/0091984 A1, requires an excessively large force to rotate the permanent magnet from the attracted and fixed state in the reverse direction. The transducer is provided with a return spring for returning the permanent magnet to the same posture, and in this regard, U.S. Patent Application Publication No. 2006/0091984 A1 describes that a return spring has to be used which exerts a force greater than the magnetic holding force at the stop point. Accordingly, when the permanent magnet rotates, a force is required which combines a force that is required to separate the first magnet layer and the second magnet layer from the stop point and a force that resists the return spring. If an excessive operating force is not provided, the device cannot be operated.

SUMMARY

A power generation input device according to an aspect of the invention includes a magnetic path forming member formed of a magnetic material; a first opposing end surface and a second opposing end surface that are a portion of the magnetic path forming member and opposed to each other with a space interposed in between; a power generation coil wound on the magnetic path forming member between the first opposing end and the second opposing end; a rotating body positioned in the space and rotates about a shaft which is orthogonal to the opposing direction of the first opposing end and the second opposing end as a support point; and an operating member giving a rotation force to the rotating body.

The rotating body has a magnet having a first magnetization surface and a second magnetization surface which become reverse magnetic poles each other, a first magnetization member that is fixed at the first magnetization surface and formed of a magnetic material, and a second magnetization member that is fixed at the second magnetization surface and formed of the magnetic material.

The rotating body is reciprocally rotated by the operating member between a first posture and a second posture, wherein in the first posture, an end of the first magnetization member is opposed to the first opposing end via a gap and an end of the second magnetization member is opposed to the second opposing end via a gap, and in the second posture, the end of the first magnetization member is opposed to the second opposing end via the gap and the end of the second magnetization member is opposed to the first opposing end via the gap.

The power generation input device of the invention is configured such that since the first magnetization member and the second magnetization member are magnetically attracted to two opposing ends of the magnetic path forming member in both directions when the rotating body rotates to the first posture and to the second posture, the rotation speed of the rotating body is naturally accelerated. Thus, the amount of change per unit time of the magnetic flux in the magnetic path forming member is large and the power generation efficiency becomes higher.

In addition, when the rotating body rotates to the first posture and to the second posture, since the gap is formed between the first magnetization member, the second magnetization member and the opposing end of the magnetic path forming member, an excessive operating force is not required when rotating the rotating body from the first posture or rotating the rotating body from the second posture. Accordingly, the operation is extremely easy.

DESCRIPTION OF THE EXEMPLARY EMBODIMENTS

Figure 1:
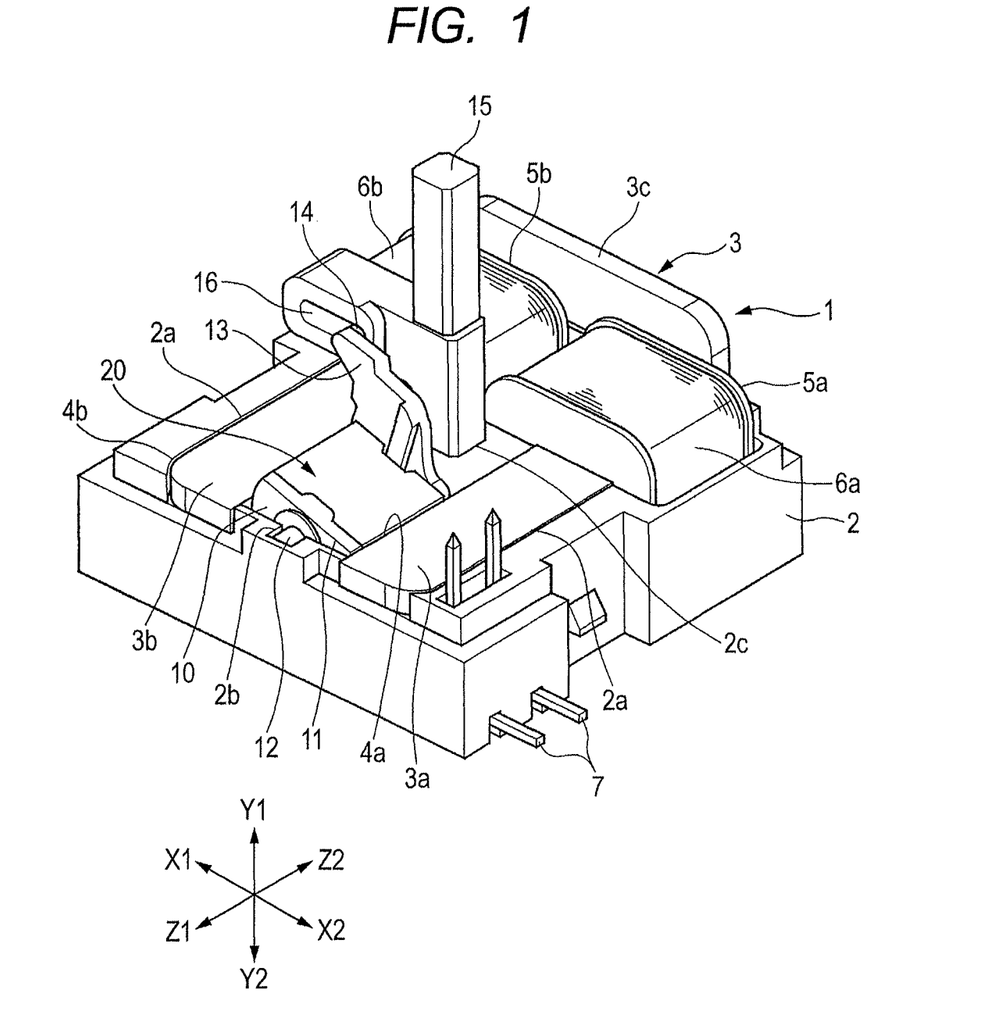
FIG. 1 is a perspective view illustrating an overall structure of a power generation input device of an embodiment of the invention.

A power generation input device 1 shown in FIG. 1 has a housing 2. The housing 2 shown in FIG. 1 is a lower housing and an upper housing (not shown) is disposed on the housing 2.

Figure 2:
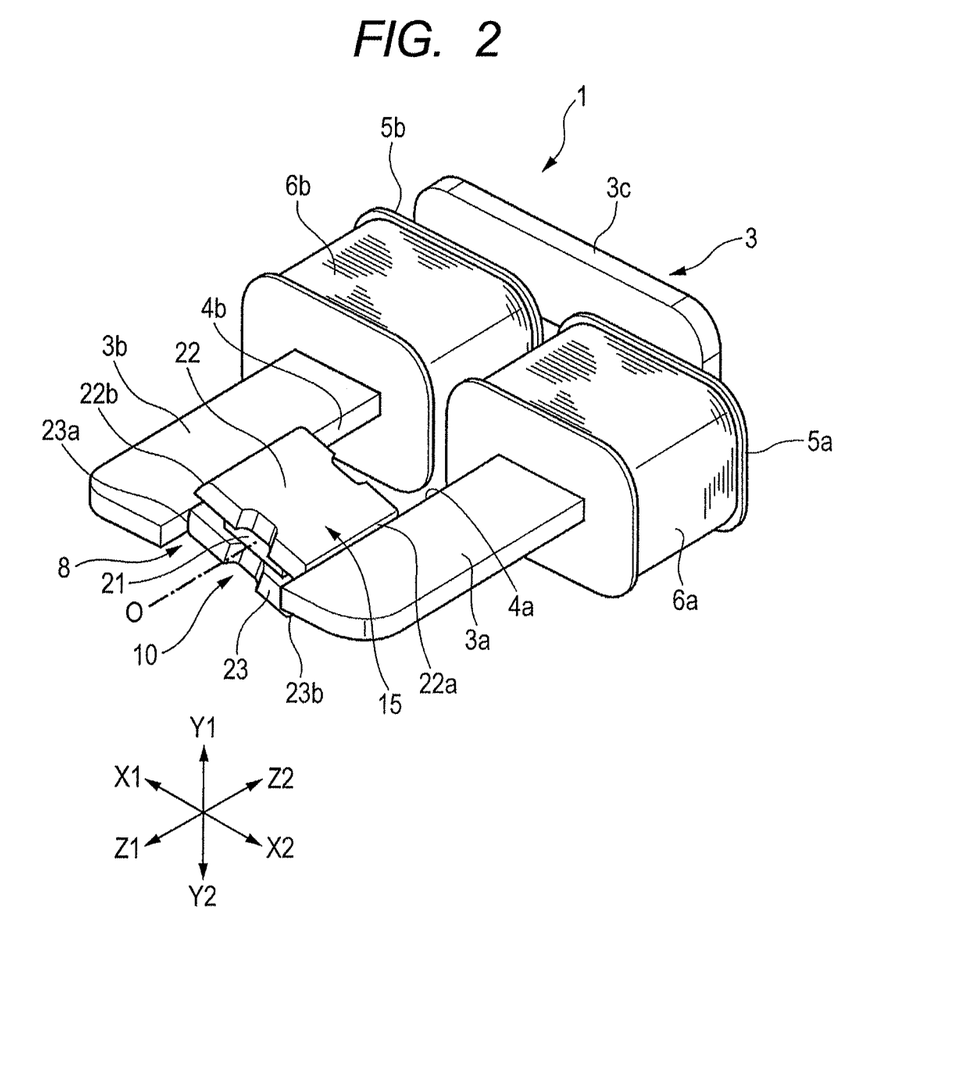
FIG. 2 is a partial perspective view illustrating a positional relationship between a magnetic path forming member, a coil and a magnetic flux generation portion of the power generation input device.

A magnetic path forming member 3 is held in the housing 2. As shown in FIG. 2, the magnetic path forming member 3 is configured such that a first arm portion 3a, a second arm portion 3b and a coupling portion 3c are integrally formed in succession. The U-shaped the magnetic path forming member 3 is formed of a soft magnetic metal plate and the coupling portion 3c is bent substantially at a right angle upward.

The first arm portion 3a has a first opposing end 4a and the second arm portion 3b has a second opposing end 4b.

In FIGS. 1 to 4, the opposing direction along plate surfaces of the first arm portion 3a and the second arm portion 3b is shown in X direction, and the thickness direction of the plates of the first arm portion 3a and the second arm portion 3b is shown in Y direction orthogonal to the X direction. An induction direction of a magnetic flux in the first arm portion 3a and the second arm portion 3b is further shown in Z direction.

The first opposing end 4a of the first arm portion 3a and the second opposing end 4b of the second arm portion 3b are extended in parallel to each other in the induction direction (the Z direction). The first opposing end surface 4a and the second opposing end surface 4b have flat end surfaces parallel to Y-Z planes.

A first bobbin 5a is disposed around the outer circumference of the first arm portion 3a of the magnetic path forming member 3 and a first power generation coil 6a is wound in the first bobbin 5a. A second bobbin 5b is disposed around the outer circumference of the second arm portion 3b and a second power generation coil 6b is wound in the second bobbin 5b.

As shown in FIG. 1, the housing 2 is formed with a holding recess 2a, the magnetic path forming member 3, the first bobbin 5a and the second bobbin 5b are fitted into, positioned to fix in the holding recess 2a.

A winding conductive wire of the first power generation coil 6a and a winding conductive wire of the second power generation coil 6b are connected in series and both ends of the conductive wire are individually connected to a pair of power generation terminals 7 fixed to the housing 2.

As shown in FIG. 1, a rotating body 10 is disposed in the housing 2. The rotating body 10 has a rotation holder 11 which is formed of a synthetic resin that is a magnetic insulating material. A rotation shaft 12, which is projected in the Z1 direction and the Z2 direction, is integrally formed with the rotation holder 11. A bearing 2b is formed in the housing 2 and the rotation shaft 12 is rotatably held in the bearing 2b so that the rotating body 10 is rotatably supported about a shaft center O extending in the Z direction.

As shown in FIG. 1, a rotation arm 13 is integrally formed with an end of the rotation holder 11 in Z2 side and a coupling pin 14 of which the axial direction extends in the Z direction at a tip of the rotation arm 13, is integrally formed. The housing 2 is formed with a sliding bearing 2c penetrating in the Y direction that is the vertical direction thereof and an operating member 15 is slidably held in the sliding bearing 2c. The operating member 15 is formed with a coupling long hole 16 extending in the X direction and the coupling pin 14 is slidably inserted in the coupling long hole 16.

A coupling mechanism, which converts a moving force of the operating member 15 in the vertical direction (in the Y direction) to a rotating force about the shaft center 0 of the rotating body 10 as the center thereof, is configured of the coupling pin 14 and the coupling long hole 16.

Figure 3:
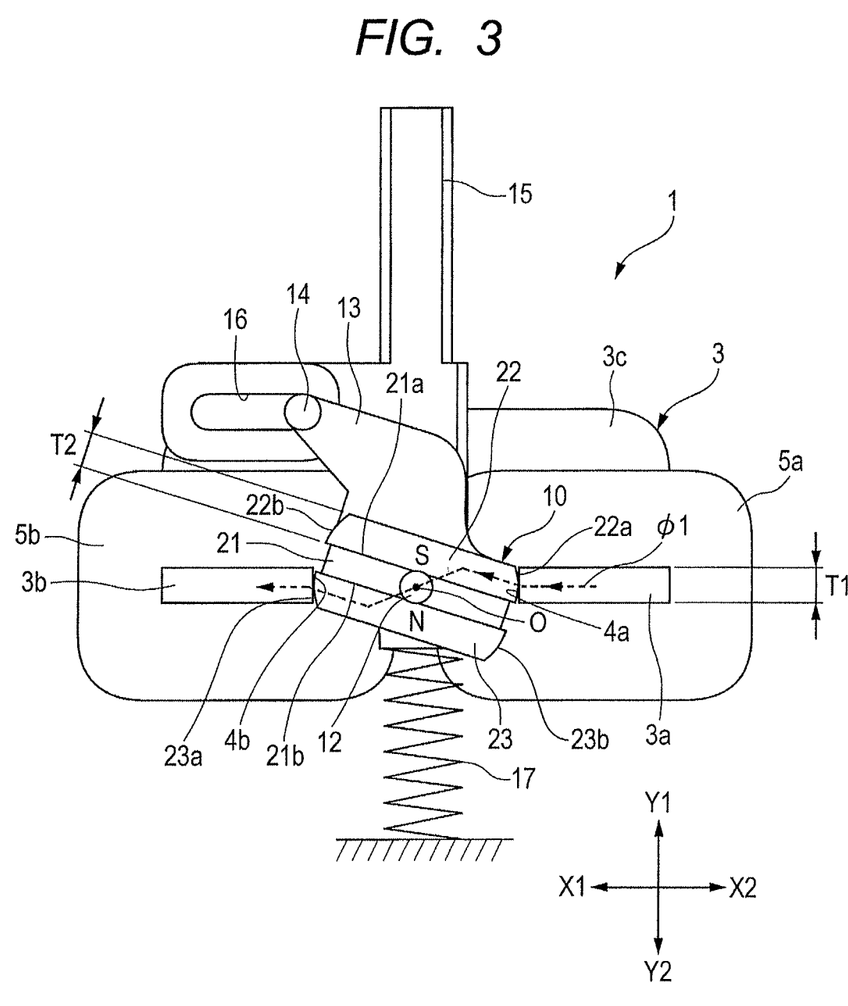
FIG. 3 is a side view of the power generation input device when a rotating body is in a first posture.
Figure 4:
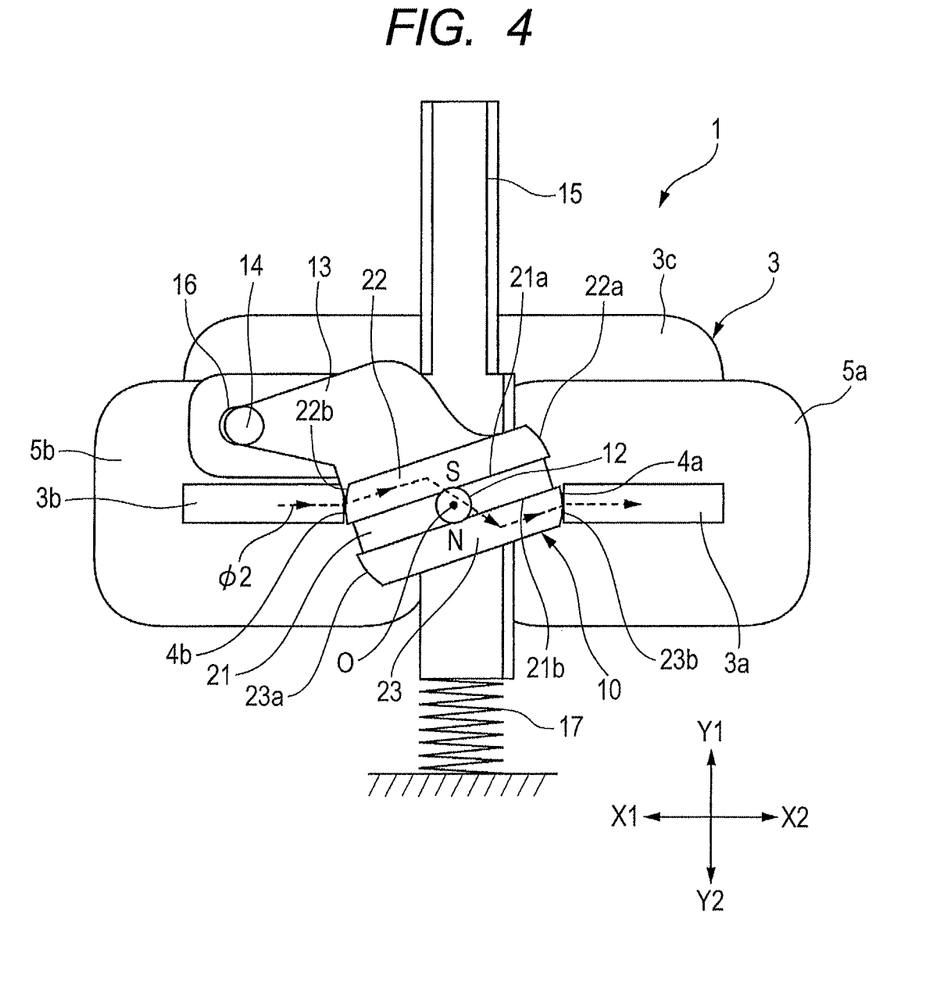
FIG. 4 is a side view of the power generation input device when the rotating body is in a second posture.

As shown in FIGS. 3 and 4, a return spring 17 is disposed inside the housing 2 and the operating member 15 is always biased in the Y1 direction (the returning direction) by the return spring 17.

A magnetic flux generation portion 20 is fixed at the rotation holder 11 in the rotating body 10. The magnetic flux generation portion 20 positions inside a space 8 where the first opposing end 4a and the second opposing end 4b of the magnetic path forming member 3 are opposed to each other. As shown in FIGS. 3 and 4, the magnetic flux generation portion 20 has a permanent magnet 21. The permanent magnet 21 is a plate-shaped magnet and one plane of opposing planes above and below is a first magnetization surface 21a, and the other plane is a second magnetization surface 21b. The first magnetization surface 21a and the second magnetization surface 21b are magnetized each other in reverse polarity. In the embodiment shown in FIGS. 3 and 4, the first magnetization surface 21a is magnetized as an S pole and the second magnetization surface 21b is magnetized as an N pole.

A first magnetization member 22 is fixed to the first magnetization surface 21a and a second magnetization member 23 is fixed to the second magnetization surface 21b. The first magnetization member 22 and the second magnetization member 23 are soft magnetic metal plates. The first magnetization member 22 has a first end surface 22a directing to the X2 side and a second end surface 22b directing to the X1 side. The second magnetization member 23 has a first end surface 23a directing to the X1 side and a second end surface 23b directing to the X2 side.

As shown in FIGS. 3 and 4, each of the end surfaces 22a, 22b, 23a and 23b is formed in a curved surface shape so as to conform to a cylindrical surface having a center at the shaft center O that is the center of the rotation shaft 12. As shown in FIGS. 3 and 4, when the end surface 22*a* of the first magnetization member 22 or the end surface 23*b* of the second magnetization member 23 is opposed to the first opposing end surface 4*a*, a fine gap is formed in the opposing portions without coming into contact with between the end surface 22*a* or the end surface 23*b* and the first opposing end surface 4*a*. Similarly, when the end surface 22*b* of the first magnetization member 22 or the end surface 23*a* of the second magnetization member 23 is opposed to the second opposing end surface 4*b*, a fine gap is formed in the opposing portion without coming into contact with between the end surface 22*b* or the end surface 23*a* and the second opposing end surface 4*b*.

As shown in FIG. 3, a thickness dimension T2 of the first magnetization member 22 is equal to or greater than a thickness dimension T1 of the magnetic path forming member 3 and when the first end surface 22*a* of the first magnetization member 22 is opposed to the first opposing end surface 4*a*, an opposing area thereof is not smaller than the area of the first opposing end surface 4*a*. This is also the same even when the second end surface 22*b* of the first magnetization member 22 and the second opposing end surface 4*b* are opposed to each other. In addition, when the thickness dimension of the second magnetization member 23 is also the thickness dimension T2 and the end surface 23*a* or the end surface 23*b* is opposed to the opposing end surfaces 4*a* and 4*b*, the opposing area thereof is not smaller than the area of the opposing end surfaces 4*a* and 4*b*.

The thickness dimensions T1 and T2 have the relationship described above so that transmission efficiency of the magnetic flux from the first magnetization member 22 and the second magnetization member 23 to the magnetic path forming member 3 increases.

Next, an operation of the power generation input device 1 is described.

As shown in FIG. 3, when an external force is not applied to the operating member 15, the operating member 15 is returned in the Y1 direction by the biasing force of the return spring 17 and the coupling pin 14 is lifted by the coupling long hole 16 of the operating member 15. The rotating body 10 is in the first posture where the rotating body 10 rotates in the clockwise direction in FIG. 3. When the rotating body 10 is in the first posture, the first end surface 22*a* of the first magnetization member 22 is opposed to the first opposing end surface 4*a* of the magnetic path forming member 3 with the fine gap and the first end surface 23*a* of the second magnetization member 23 is opposed to the second opposing end surface 4*b* with the fine gap. In addition, the second end surface 22*b* of the first magnetization member 22 is separated from the second opposing end surface 4*b* and the second end surface 23*b* of the second magnetization member 23 is separated from the first opposing end surface 4*a*.

In a state shown in FIG. 3, the first end surface 22*a* and the first opposing end surface 4*a* are magnetically attracted and the first end surface 23*a* and the second opposing end surface 4*b* are magnetically attracted by the magnetic force of the permanent magnet 21 so that the rotating body 10 is allowed to be stable in the first posture.

A push button (not shown) is fixed on the upper portion of the operating member 15. When the operating member 15 is pressed from the state of FIG. 3 in the Y2 direction by the pressing operation of the push button, the coupling pin 14 is pressed down by the coupling long hole 16 of the operating member 15 and the rotating body 10 rotates in the counterclockwise direction. When the operating member 15 is pressed down to the last end, the rotating body 10 is in the second posture shown in FIG. 4. In the second posture, the second end surface 22*b* of the first magnetization member 22 is opposed to the second opposing end surface 4*b* of the magnetic path forming member 3 with the fine gap and the first end surface 22*a* separates from the first opposing end surface 23*b*. In addition, the second end surface 23*b* of the second magnetization member 23 is opposed to the first opposing end surface 4*a* with the fine gap and the first end surface 23*a* separates from the second opposing end surface 4*b*.

In a state shown in FIG. 4, the second end surface 22*b* and the second opposing end surface 4*b* are magnetically attracted and the second end surface 23*b* and the first opposing end surface 4*a* are magnetically attracted by the magnetic force of the permanent magnet 21 so that the rotating body 10 is allowed to be stable in the second posture.

Just after the operating member 15 is pressed to the last end in the Y2 direction in the pressing operation of the usual push button, the pressing force to downward is released. When the pressing force is released, the operating member 15 is pressed back by the pressing force of the return spring 17 in the Y1 direction and the returning rotation force is provided to the rotating body 10 in the clockwise direction. At this time, the rotating body 10 rotates from the stable state of the second posture shown in FIG. 4 in the clockwise direction and returns to the first posture shown in FIG. 3.

Figure 5:
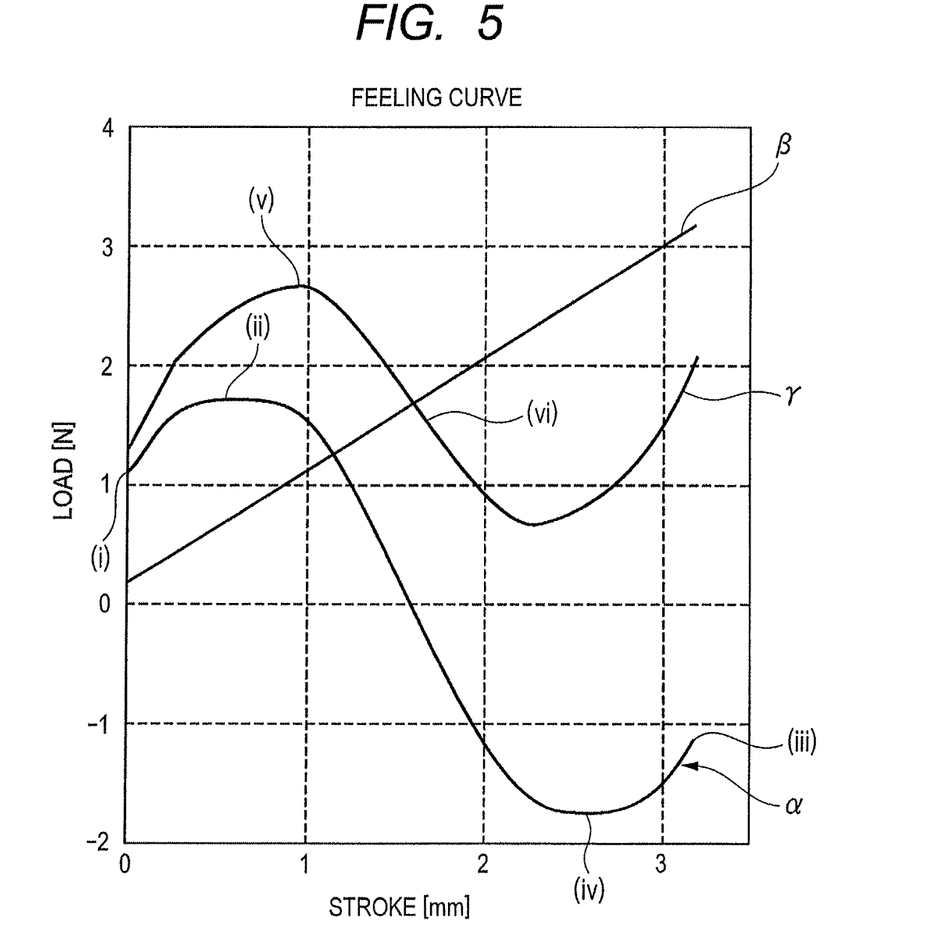
FIG. 5 is a line diagram illustrating a relationship between a magnetic attractive force, an elastic force and an operating reaction force of a return spring.

A curve α shown in the line diagram of FIG. 5 illustrates a relationship between a stroke (mm) of the operating member 15 and a reaction force (N) acting on the operating member 15 when the elastic force of the return spring 17 is ignored. The positive side of the reaction force on the vertical axis is the size of the force acting upward against the operating member 15 and the negative side of the reaction force on the vertical axis is the size of the force acting downward against the operating member 15.

In the curve α, (i) is a force that allows the rotating body 10 to be stable in the first posture shown in FIG. 3, (ii) is a maximum value of a force required when the rotating body 10 is departed from the stable state of the first posture and then rotates in the counterclockwise direction. (iii) is a force that allows the rotating body 10 to be stable in the second posture shown in FIG. 4, (iv) is a maximum value of a force required when the rotating body 10 is departed from the second posture and then rotates in the clockwise direction.

A straight line β shown in FIG. 5 illustrates only the change of the return force provided to the operating member 15 from the return spring 17 when the magnetic attractive force of the magnetic flux generation portion 20 is ignored. A curve γ adds the curve α and the straight line β and it illustrates a change of the reaction force which acts when the operating member 15 is operated in the power generation input device 1 of the embodiment. The elastic force of the return spring 17 is set as the straight line β so that the operating reaction force can always be acted to upward. Accordingly, when the pressing force acting on the operating member 15 is released after the operating member 15 is pressed downward to the second posture shown in FIG. 4, the rotating body 10 and the operating member 15 can be returned to the first posture shown in FIG. 3 by the elastic force of the return spring 17.

In the second posture shown in FIG. 4, the first magnetization member 22 and the second magnetization member 23 opposed to each other with the fine gap without coming into contact with the first opposing end surface 4*a* and the second opposing end surface 4*b*. Thus, the force required to return the rotating body 10 from the second posture in the clockwise direction is not excessively large and the rotating body 10 can be returned to the first posture with the elastic force of the usual spring having the characteristics of the straight line β shown in FIG. 5.

In the first posture shown in FIG. 3, the first magnetization member 22 and the second magnetization member 23 are opposed to each other with the fine gap without coming into contact with the first opposing end surface 4a and the second opposing end surface 4b. Thus, the force required to rotate the rotating body 10 from the first posture of FIG. 3 in the counterclockwise direction is not excessively large. Furthermore, since the elastic force of the return spring 17 is not required to be excessively strong, the maximum force that is required to lower the operating member 15, as shown (v) in FIG. 5, does not become excessively large and then the operating member 15 is easily operated.

At the time of the first posture shown in FIG. 3, the magnetic flux Φ1 emanating from the permanent magnet 21 is provided to the second arm portion 3b of the magnetic path forming member 3 via the second opposing end surface 4b from the end surface 23a of the second magnetization member 23. The magnetic flux Φ1 follows a path leading to the first arm portion 3a via the coupling portion 3c of the magnetic path forming member 3 and returns to the first magnetization member 22 via the end surface 22a from the first opposing end surface 4a. When becoming the second posture shown in FIG. 4, the magnetic flux Φ2 emanating from the permanent magnet 21 follows a path leading to the second arm portion 3b via the coupling portion 3c from the first arm portion 3a.

As shown in (vi) of the curve γ in FIG. 5, in the power generation input device 1 shown in FIG. 1, when the operating member 15 is pressed in the Y2 direction, the rotating body 10 rapidly rotates to the second posture shown in FIG. 4 due to the magnetic attractive force. In addition, when the pressing force is removed after the operating member 15 is pressed downward, the rotating body 10 rapidly rotates to the first posture shown in FIG. 3 due to the magnetic attractive force and the elastic force of the return spring 17.

Thus, when the operating member 15 is pressed in the Y2 direction, the amount of change per unit time of the magnetic flux is large when the magnetic flux changes from Φ1 to Φ2 in the magnetic path forming member 3 and large induced electromotive force can be obtained from the power generation coils 6a and 6b. Similarly, when the operating member 15 returns in Y1 direction, the amount of change per unit time of the magnetic flux is large when the magnetic flux changes from Φ2 to Φ1 in the magnetic path forming member 3 and large induced electromotive force can be obtained from the power generation coils 6a and 6b.

Furthermore, since the magnetic flux changes in the opposing direction between Φ1 and Φ2, the amount of change of the magnetic flux itself is large and the induced electromotive force can be large.

As described above, as shown in FIG. 5, the power generation input device 1 shown in FIG. 1 is configured such that the reaction force is not excessively large when the operating member 15 is pressed in the Y2 direction, and moreover, in both directions when the operating member 15 is pressed in the Y2 direction and when the operating member 15 returns in the Y1 direction, the amount of change per unit time of the magnetic flux in the magnetic path forming member 3 can be large and large induced electromotive force can be obtained from the power generation coils 6a and 6b.

Figure 6:
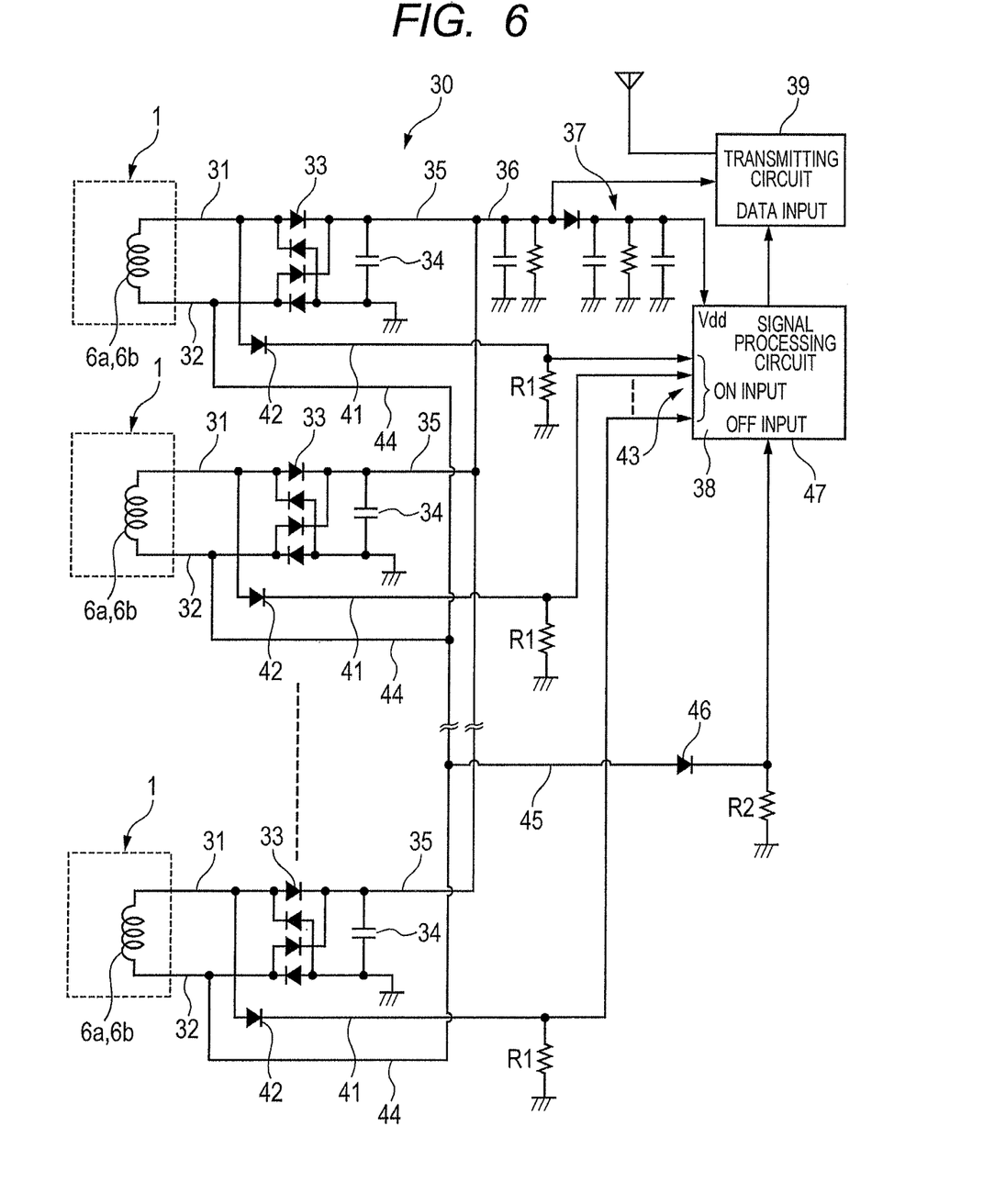
FIG. 6 is a circuit diagram of an electronic apparatus of an embodiment of the invention.

FIG. 6 is a circuit diagram of an electronic apparatus 30 including a plurality of the power generation input devices 1. The electronic apparatus 30 is a transmitter or a remote controller that transmits an operating signal when each of the power generation input devices 1 is operated.

Figure 7A:
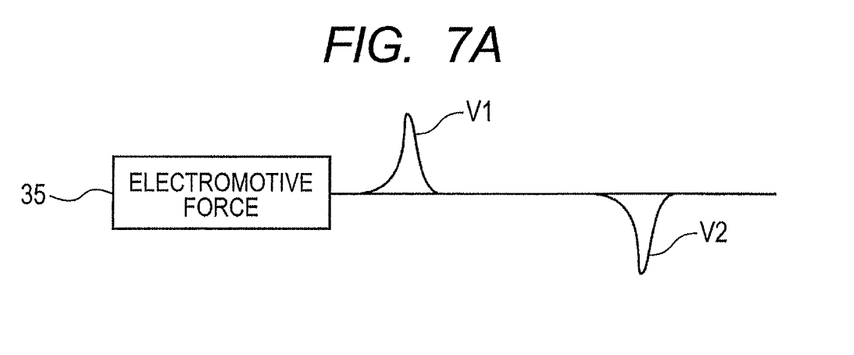
FIGS. 7A to 7C are line diagrams illustrating waveforms of an electromotive force of the electronic apparatus.

When the operating member 15 of the power generation input device 1 is pressed in the Y2 direction, the rotating body 10 rotates from the first posture shown in FIG. 3 to the second posture shown in FIG. 4, and at this time, a first electromotive force V1 (a first induced current) shown in FIG. 7A generates between an end 31 and an end 32 of the power generation coils 6a and 6b connected in series. When the pressing force to the operating member 15 is released and is returned by the return spring 17, the rotating body 10 rotates from the second posture to the first posture and at this time, a second electromotive force V2 (a second induced current) generates between the end 31 and the end 32 of the power generation coils 6a and 6b.

The first electromotive force V1 and the second electromotive force V2 which are different to each other in the polarity are discharged after charging in a capacitor 34 via a diode group 33 so that wavelengths of the first electromotive force V1 and the second electromotive force V2 in an electric power line 35 are slightly increased.

As shown in FIG. 6, each of the electric power lines 35 of a plurality of power generation input devices 1 is gathered in one electric power line 36. A rectifier circuit 37 is disposed in the electric power line 36 and the electromotive force that is generated in the power generation input device 1 is converted to a DC component so as to give to a power source input portion of a signal processing circuit 38 and a transmitting circuit 39.

Figure 7B:
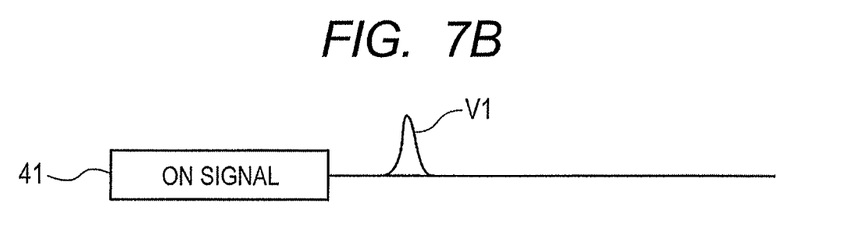

An ON signal line 41 is pulled out from one end 31 of the power generation coils 6a and 6b in each of the power generation input devices 1. A diode 42 is disposed in each of the ON signal lines 41 and as shown in FIG. 73, the first electromotive force V1 can be passed through. Each of the ON signal line 41 is individually connected to a plurality of ON signal input portions 43 provided in the signal processing circuit 38. When any one of the power generation input devices 1 is operated and the first electromotive force V1 is obtained, an ON signal of the voltage value set at a resistance R1 is individually provided to the signal processing circuit 38 from the ON signal line 41. The ON signal is individually input from each of the power generation input devices 1 so that the signal processing circuit 38 can identify which of the power generation input devices 1 is operated.

Figure 7C:
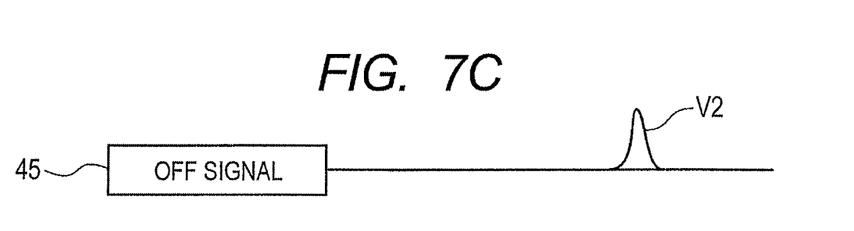

An OFF signal line 44 is pulled out from the other end 32 of the power generation coils 6a and 6b in each of the power generation input devices 1. The OFF signal lines 44 of the whole of the power generation input devices 1 are collected to a common line 45. A common diode 46 is connected to the common line 45. Even though any one of the power generation input devices 1 is operated, the second electromotive force V2 shown in FIG. 7C is provided to the common line 45 and passes through the common diode 46 so as to become the OFF signal of the voltage value which is determined in a resistance R2 and to provide to an OFF signal input portion 47 of the signal processing circuit 38.

In the electronic apparatus 30 shown in FIG. 6, when the operating member 15 of any one of the power generation input devices 1 is pressed, the electromotive force thereof is rectified in the rectifier circuit 37 so as to provide to the signal processing circuit 38 and the transmitting circuit 39. Thus, the signal processing circuit 38 and the transmitting circuit 39 can be in the operable state.

In addition, the ON signal is provided to the signal processing circuit 38 due to the first electromotive force V1 generated from the power generation input device 1. The signal processing circuit 38 identifies which of the power generation input devices 1 are operated and the transmitting signal corresponding to the power generation input device 1 that is operated is provided and transmitted to the transmitting circuit 39. Regardless of which of the power generation input devices 1 is operated, the second electromotive force V2 from the power generation input device 1 is provided to the signal processing circuit 38 as the OFF signal from the common line 45. When the signal processing circuit 38 receives the OFF signal, the transmittance of the transmitting signal to the transmitting circuit 39 is stopped and the transmitting operation is finished.

In the circuit shown in FIG. 6, since the OFF signal is aggregated in one common line 45, the number of the wirings of the circuit can be decreased and the configuration of the circuit can be simplified.

It should be understood by those skilled in the art that various modifications, combinations, sub-combinations and alterations may occur depending on design requirements and other factors insofar as they are within the scope of the appended claims of the equivalents thereof.

What is claimed is:

1. A power generation input device comprising:
   a magnetic path forming member comprising a magnetic material;
   a first opposing end surface and a second opposing end surface that are a portion of the magnetic path forming member and opposed to each other with a space interposed in between;
   a power generation coil wound on the magnetic path forming member between the first opposing end and the second opposing end;
   a rotating body positioned in the space to rotate about a shaft which is orthogonal to the opposing direction of the first opposing end and the second opposing end as a support point; and
   an operating member providing a rotation force to the rotating body,
   wherein the rotating body has a magnet having a first magnetization surface and a second magnetization surface which become reverse magnetic poles to each other, a first magnetization member that is fixed at the first magnetization surface and comprised of a magnetic material, and a second magnetization member that is fixed at the second magnetization surface and comprised of the magnetic material, and
   the rotating body is reciprocally rotated by the operating member between a first posture and a second posture, wherein in the first posture, an end of the first magnetization member is opposed to the first opposing end via a gap and an end of the second magnetization member is opposed to the second opposing end via a gap, and in the second posture, the end of the first magnetization member is opposed to the second opposing end via the gap and the end of the second magnetization member is opposed to the first opposing end via the gap.

2. The power generation input device according to claim 1, wherein the magnet, the first magnetization member and the second magnetization member are overlapped orthogonal to an extending direction of the shaft, in the first posture, one end of the first magnetization member is opposed to the first opposing end via the gap, the other end is not opposed to the second opposing end, one end of the second magnetization member is opposed to the second opposing end via the gap and the other end is not opposed to the first opposing end, and
   in the second posture, one end of the first magnetization member is not opposed to the first opposing end, the other end is opposed to the second opposing end via the gap, one end of the second magnetization member is not opposed to the second opposing end and the other end is opposed to the first opposing end via the gap.

3. The power generation input device according to claim 1, wherein in the first posture, the first magnetization member is magnetically attracted to the first opposing end via the gap and the second magnetization member is magnetically attracted to the second opposing end via the gap, and
   in the second posture, the first magnetization member is magnetically attracted to the second opposing end via the gap and the second magnetization member is magnetically attracted to the first opposing end via the gap.

4. The power generation input device according to claim 3, further comprising a return spring which overcomes the magnetic attractive force in the second posture and returns the rotating body to the first posture.

5. An electronic apparatus comprising:
   the power generation input device according to claim 4; and
   a signal processing circuit driven by an electromotive force obtained from the power generation coil when the rotating body rotates.

6. The electronic apparatus according to claim 5, further comprising a transmitting circuit that is driven by the electromotive force, and
   wherein when the rotating body rotates from the first posture to the second posture and provides a first electromotive force from the power generation coil and when the rotating body rotates from the second posture to the first posture and provides a second electromotive force from the power generation coil, the signal processing circuit performs switching of the transmitting circuit.

7. The electronic apparatus according to claim 6, wherein a plurality of the power generation input devices are provided, the first electromotive force obtained from each of the power generation input devices is provided to the signal processing circuit respectively and the second electromotive force obtained from a plurality of power generation input devices is provided to the signal processing circuit from a common line.

8. The electronic apparatus according to claim 7, further including a diode that passes through the second electromotive force in the common line.

* * * * *